United States Patent [19]
Henssen

[11] 3,837,921
[45] Sept. 24, 1974

[54] STORAGE OXYGEN DEPOLARIZED CELL

[75] Inventor: Hans Friedrich Henssen, Oberhochstadt, Germany

[73] Assignee: Compagnie Industrielle des Piles Electriques, Perret, France

[22] Filed: Aug. 3, 1972

[21] Appl. No.: 277,611

[30] Foreign Application Priority Data
Aug. 5, 1971  Germany............................ 2139227

[52] U.S. Cl. .............................. 136/86 A, 136/177
[51] Int. Cl. ......................................... H01m 27/00
[58] Field of Search.......................... 136/86 A, 177

[56] References Cited
UNITED STATES PATENTS
2,938,064   5/1960   Kordesah........................... 136/86 A
3,697,326   10/1972   Jammet............................ 136/86 A Primary Examiner—Winston A. Douglas
Assistant Examiner—H. A. Feeley
Attorney, Agent, or Firm—Kenyon & Kenyon Reilly Carr & Chapin

[57] ABSTRACT

Storable air depolarization cell provided with an electrolyte-repellent porous positive electrode, a separator layer and a powdered negative zinc electrode. Spaces having walls that are permeable to gases and impervious to the electrolyte extend along the negative electrode and serve as gas collectors and communicate through valve means with an exhaust space in the upper part of the cell. Such a cell can be stored for a long time prior to use and is leakproof as to electrolyte.

12 Claims, 4 Drawing Figures

STORAGE OXYGEN DEPOLARIZED CELL

BACKGROUND OF INVENTION AND BRIEF SUMMARY OF INVENTION

This invention relates to a leakproof, storable oxygen depolarized cell with porous, electrolyte-repellent positive electrode bodies, made, for instance, of powdered active carbon, with a separator layer, and having a negative electrode made of powdery zinc, zinc gratings or zinc sponge with the electrolyte immobilized therein. With cells of this type, it is necessary that oxygen be available at the electrochemically active zone upon occurrence of current consumption. In accordance with consumption requirements, the oxygen must be continuously replenished with oxygen from the external atmosphere passing to said zone via the porous structure of one electrode. In the process, one encounters the problem that, in the course of the oxygen replenishment, gaseous and liquid substances can escape to the external environment in opposite directions. While the loss of gaseous conversion products in themselves is admissible, the loss of liquid components is harmful and inadmissible.

The porous carbon body of the porous electrode which must be accessible to the air or the atmospheric oxygen must not permit external escape of electrolyte fluid. One known arrangement resides in the fact that the base material for the porous electrode is rendered electrolyte-repellent. It is therefore to be endeavored to achieve a high degree of porosity to achieve the reciprocal effect of atmospheric oxygen with the active carbon substance and adequate strength of the electrode body. It is furthermore intended, that, as the air travels through the porous structure, existing carbon dioxide and humidity are to be filtered out. These requirements have been met by bodies made of powdered active carbon having a grain diameter of approximately $5\mu$ (microns) (German Disclosure No. 1,471,638) referred to for instance as "shaking" electrodes. The powder is rendered electrolyte-repellent in per se known manner, for instance by means of paraffins, and while subjecting it to a slight pressure, is placed into a sheath that may consist of a fine metal mesh. The mesh size of this sheath is determined substantially by the grain size of the powdered active carbon. It can be reinforced additionally with respect to the other electrode by means of a coarser reinforcing netting grid or screen. The subsequent layer is constituted by an electrolyte-saturated separator layer designed for the required electrochemical cycles. The separator layer is followed by the negative electrode preferably consisting of amalgamated zinc flakes or gratings or zinc sponge, i.e., zinc in a condition in which the electrolyte is retained by means of capillary action.

The present invention is based on the described or a similar structure of the active components of the cell (see Siller "Luftsauerstoffelemente" 1968, VDI-Verlag, p. 106) and has as an object to discharge externally into the atmosphere the gases generated internally in the area of fixed electrolyte in such a way that, on the one hand, the active zone of the carbon electrode is by-passed without carrying along any electrolyte fluid and that, on the other hand, air or atmospheric oxygen cannot reach the negative electrode via this route in the opposite direction.

The present invention is characterized further by the fact that in the case of an oxygen cell of the aforedescribed type there extends along the negative electrode free chambers having gas-permeable porous walls to act as gas absorption chambers and which are connected above the negative electrode by at least one valve or by a layer acting as such with a gas collector chamber out of which the gases generated inside the cell can vent externally through at least one duct and through the upper part of the porous, electrolyte-repellent electrode body. The present invention insures that the gases generated inside the cell can be directed outwardly in the dry state and the valve effects insures on the other hand, that oxygen cannot via said valve reach the negative electrode either during storage prior to commencement of operation or during idling periods. While the escape of the gases generated inside the cell is facilitated by means of these ducts, the other path through the impregnated separator and the porous carbon body can be considered to be blocked.

The valve device can be arranged between the gas absorption chambers and the gas collector chamber and consists for instance of an elastic membrane having a normally closed slot or else one provided with piercings. Designed as a layer, coarse foam rubber, uniformly impregnated with paraffin, proved to be suitable.

The valves or the layers acting as a valve in this case are not intended for relief of internal overpressure as is required with other known cells. In view of the porous and air-accessible nature of the carbon electrode, such relief need not be required or anticipated. However, what should be underscored is the double function of the valve device: to permit in the case of a small flow pressure, the flow from the inside to the outside of the generated gases and to prevent a pressureless exchange of air from the outside to the inside through diffusion to the detriment of the negative electrode.

In order to render even more difficult the entry into the porous carbon body of the gas against the electrolyte-saturated separator, the separator may consist of electrolyte-retaining materials that can be readily wetted by or swelled by the electrolyte. What is to be endeavored in this connection is also that the surface of the carbon electrode is kept moist. In this way, the carbon retains its activity for particularly extended periods. If the mentioned fine metal mesh cannot be rendered sufficiently wettable by an appropriate surface treatment, the netting should consist of at least two types of filaments, one of which is nonconductive but electrolyte-bonding while the other type is conductive.

Further simplification occurs if a sleeve or a cup as a separator of adequate dimensional stability is used to serve as a container for the carbon powder. In that respect, a head segment of the carbon electrode designed to be stable can also act as the positive electrode of the cell.

Additional details and advantages of the invention will become apparent from the following description of exemplified embodiments illustrated in the accompanying drawing, wherein.

DETAILED DESCRIPTION

Figure 1:
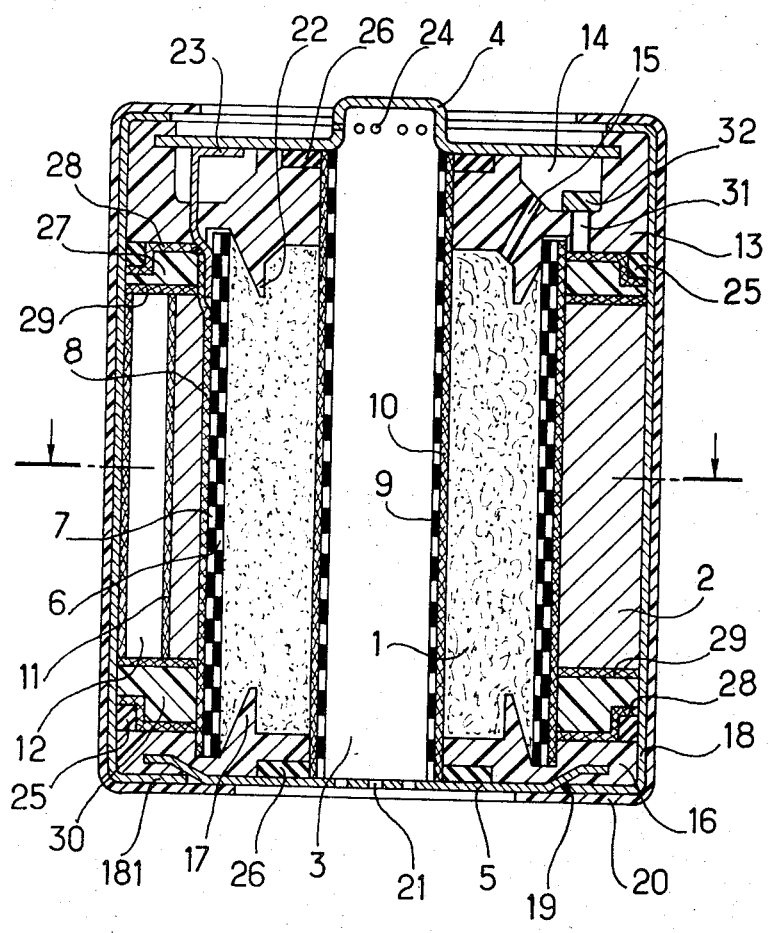
FIG. 1 is a longitudinal cross-section through an oxygen cell embodying the invention.

In FIG. 1 there is illustrated an oxygen cell in accordance with the invention. The housing may have a circular, square, rectangular, or other suitable cross-section. The carbon electrode is designated by the reference 1 and the zinc electrode by the reference 2. By means of holes 24 in the cover 4 and 21 in the bottom 5, the interior, hollow, cylindrical space 3 communicates with the atmosphere. By means of one or two gas-permeable cylindrical sleeves 9 and 10, made, for instance, of a fleece material, the air or environmental gas has access to the porous structure of the positive electrode 1 made of powdered active carbon and can penetrate it to the active surface zone of the said electrode.

In the example, the zone between the carbon electrode 1 and the zinc electrode 2 is occupied by a triple layer constituted by a fine-mesh metal grid 6, a dimensionally stable metal grid 7, and an electrolyte-saturated separator 8. The metal cover 4, as a positive pole, can be connected via a conduit 23 to the grid 6 or 7. In lieu thereof, a head segment of the carbon body designed as a rigid component can also constitute the positive pole.

Figure 2:
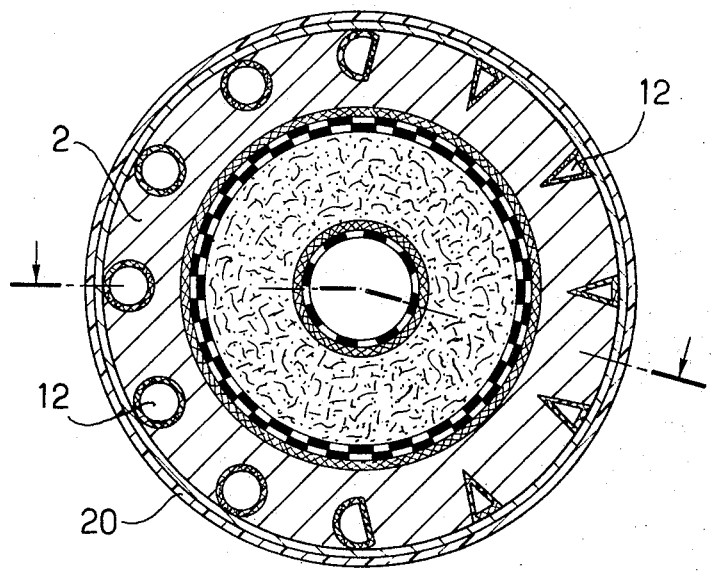
FIG. 2 is a cross-section through the cell according to FIG. 1 with two examples of cross-sectional configurations of gas collector ducts.

The gas absorption chambers in accordance with the invention are designated by the reference 12. Their walls 11 must be permeable to the gases while their cross-sectional shape can be selected discretionally corresponding to the shape of the housing; in the left-hand half of FIG. 2, the cross-section of walls 11 is circular while in the right-hand half such cross-section has the shape of a circular segment. The gas collector space 14 in accordance with the invention is formed between the cover 4 and a shaped cover plate 13.

In the structure of the cell, its bottom portion is required to provide a hermetic closure function and also to secure the position of the lower ends of the cell components. For the purpose of centering the lower ends of sleeves 9 and 10, the carbon body 1 and the separator components 6, 7 and 8, a bottom disc 16 corresponding generally to the cover plate 13 is used. The edge of the metallic bottom 5 is embedded in this bottom disc 16. A sealing gasket 26 is also interposed between the bottom 5 and bottom disc 16. Bottom disc 16 is of the same material as disc 13 as will be described below. The bottom disc 16 has an annular bead 17 with an acute edge which penetrates into the carbon mass not only for the purpose of centering but in order to compact at this region the porous carbon mass and lengthen liquid creepage paths and thus enhance obstruction of liquid leakage. In the illustrated example, the bottom 5 acts as the negative pole which is connected electrically at at least one contact point 19 with the metallic sleeve 18. The sleeve against the inner wall of which in the illustrated example the negative electrode bears is surrounded by a nonmetallic sheath or hose 20. The combination of sleeve 18, sheath 20 and the cover and bottom discs, constitutes the cell housing.

As a material for the sleeve 18 against the wall of which the negative electrode material bears, zinc is not particularly recommended on account of its properties. Other metal, for instance, steel, produces with the negative material undesirable discharges that may be combined with gas formation. In further accordance with the invention, the sleeve 18 is, for instance, of steel which is provided with a layer of zinc plate in the wall portions thereof which are contacted by the negative material. This zinc layer is passivated according to a known process that does not impair or does not significantly impair its electrical conductance. In addition to economic advantages, such passivated zinc coatings offer only little corrosion stress with respect to zinc and involves only slight development of hydrogen.

The metallic bottom 5 is provided with holes 21 in the area of the hollow space 3 for entrance of air into space 3. Additional air holes 24 are provided in cover 4 to substitute for holes 21 if they become blocked.

At the upper end of the cell, the cover disc 13 with its annular bead 22 whose acute angle edge penetrates into the carbon material performs a function like that of the bottom disc 16, i.e., the centering of the cell components and the compacting of the porous carbon material in order to extend also in this way the creep path longitudinally toward the outside. The material of the cover plate 13 is gas-impermeable and water-repellent. Because of this, it contains one or a plurality of ducts 15 for the venting of the gases out of the gas collector space 14. Likewise, for venting of gases into space 14 from the gas absorption chambers 12, ducts 31 are provided in the cover plate 13 which are suitably arranged at an angle with respect to the ducts 15. It is desirable that the distribution of the ducts 15 and 31 be arranged to achieve the greatest possible spacing from one another. Rings 25 are inserted into the sleeve 18, they serve as a support of the plates 16 and 13 if, upon the closing of the cell, the sleeve edges 181 are bent over to overlap these plates.

It is an advantage of the structure of the cell according to the invention that, even if it is upside down, its gas collector space 14 communicates with the gas absorption spaces 12 via gas-permeable layers. Experience has shown that a reliable capillary bonding of the electrolyte in the comminuted zinc can be achieved. However, an electrolyte-repellent structure of the walls 11 can also help prevent the escape of the electrolyte. A simultaneous polymerization of the walls with or their manufacture out of, for instance, polypropylene or polyethlene is suitable in this respect. With regard to the behavior of the electrolyte there is to be taken into account additionally the substantial increase in volume of the negative material in the course of the discharge. Temperature variations upon storage and discharge could be balanced out through under-wetting of the negative electrode with electrolyte, in that, in other words, a lesser amount of electrolyte is supplied than the amount that could be bonded inside the zinc; it is, however, understood that every point of the negative material must be accessible to the electrochemical reactions. The temperature-conditioned volume changes are, however, only minor compared to the chemically conditioned volume increases of the negative material. The latter may not be compensated for by underwetting.

In view of the substantial increase in volume of the material of the negative electrode 2 in the course of the cell discharge, there are arranged rings 27 and 30 made of yielding material and arranged above and below this electrode, which can be compressed by the electrode upon its expansion. The ring 27 must be pervious to gases, it is also conceivable to have a design with aligned capillaries. For a porous structure, Neoprene, enclosed by separator discs 28 and 29, has proved to be suitable. The function of absorbing a volume change in the negative electrode material through a change in shape can be advantageously combined with the other function to store a reserve of electrolyte inside this material and to put it into operation as the discharge proceeds.

In the process of the giving way upon the expansion of the negative electrode material, one can advantageously include also all the gas absorption chambers 12 surrounded to a large extent by this material (FIG. 2) if their walls are capable of yielding without impairing the gas absorbing function. This is applicable in particular if they have the circular segment cross-section like the one illustrated on the right-hand side of FIG. 2. Through a gradation in the yieldability of the rings 27 and 30 against the stiffness of the substantially radially arranged walls 11 of the absorption chambers 12 it can be provided that the walls will yield only to the end of the discharge to the expansion pressure of the negative material at which time gas formation subsides.

Within the spirit of the invention, the function of the yielding and storing can also be assigned exclusively to the lower ring 30 while the upper ring 27 acts as a valve. In the case of an internal pressure resulting from gas formation it is intended that, for instance, as a result of elastic deformation, there should open in said ring 27 a slot, a piercing, or a porous structure in the direction of the required gas flow. In order to prevent an entrance of air in opposite direction, which takes place by diffusion even without a pressure difference, the ring must be hermetically sealed in the case of balanced pressure.

Figure 3:
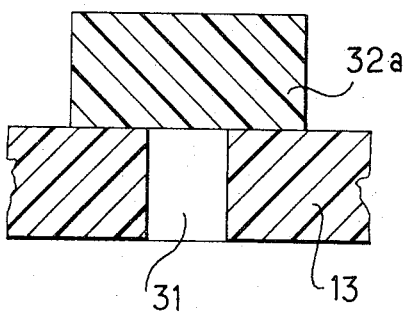
FIGS. 3 and 4 illustrate on an enlarged scale two different examples of valve means.
Figure 4:
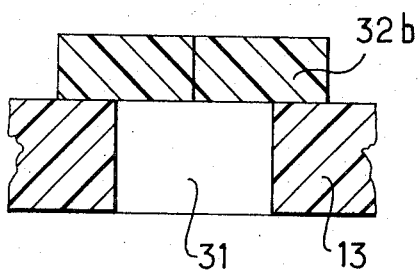

In FIGS. 3 and 4, the valve device is combined with the duct 31. FIG. 3 illustrates a porous layer 32a, made, for instance, of foam rubber, that is uniformly impregnated, with paraffin and firmly connected with the cover plate 13. In FIG. 4, the valve effect is achieved by means of a slotted layer of foam rubber 32b.

According to the invention, one must, therefore, provide from the gas absorption chambers 12 to the gas collector chamber 14 for gas permeability of the inserted layers either through the material or by means of ducts. At least one of the layers made of porous material or the like should also be reliably electrolyte-repellent. In that case of the electrolyte repelling, the porous structure is, however, not indifferent with regard to the width of its pores. The more narrow the pores the greater the capacity for compensation of the resultant increased capillary effect of the electrolyte-repellent action of the material. According to the spirit of the invention, electrolyte repelling is, therefore, to be combined with a coarse pore property.

In order still to perceive an emergence of electrolyte that may have occurred in spite all measures, for instance, through increase of volume, it is provided further according to the invention, to use electrolyte-bonding material as an additional safety. In the central hollow space 3 of the example in accordance with FIG. 1 there may be present comminuted and preferably porous electrolyte absorbing materials that provide for an absorption of drops. If these materials are provided in the hollow space 3 at least at its end with a substance that changes its color when wet by the electrolyte and if these ends or an accessible end of the hollow space is covered by a transparency the presence of leakage electrolyte is visible because of change in color.

The invention is not limited to the described embodiments. Thus, depending on the operating conditions, it is possible that, as an individual cell or in a battery, a structure conversely arranged to that in FIG. 1, i.e., in which the carbon electrode is on the outside, may be advisable. An unsymmetrical structure in layers may also be advantageous. The separator layer 8 and the grids 6, 7 can be replaced by a single layer that assumes all duties of the three and that, in particular, will function to keep the active surface of the carbon electrode moist.

Other variations in detail within the scope of the appended claims are possible. There is no intention, therefore, of limitation to the exact disclosure herein presented.

What is claimed is:

1. Leak-proof storage oxygen depolarized cell comprising a tubular metal container, a porous tubular electrolyte-repellent positive electrode extending longitudinally of said container, a tubular longitudinally extending negative electrode of comminuted material concentric with said positive electrode, a separator and immobilized electrolyte interposed between said electrodes, a plurality of elongated longitudinally extending free spaces defined by gas-permeable electrolyte repellent walls adjacent said negative electrode to serve as gas collectors in proximity to the region where gassing occurs during cell operation, said cell having an exhaust space located outwardly of one end of said positive electrode and communicating with said free spaces, gas-impermeable, liquid repellent cover means at opposite ends of said positive and negative electrodes and one-way valve-like means in that one of said covers adjacent said exhaust space providing communication between said free spaces and said exhaust space to permit escape of gases developed in said free spaces into said exhaust space during operation of said cell, one of said cover means being adjacent said exhaust space and having a passage between said exhaust space and positive electrode to permit escape outwardly of gases from said exhaust space via said positive electrode while precluding escape outwardly of liquid from the cell, a perforate metallic member at one end of said container electrically connected to said positive electrode and a perforate metallic member at the opposite end of said container connected electrically to said container, said metallic members serving respectively as output terminals for said cell, and whose perforations permit access of air to said positive electrode as well as escape of collected gas from said exhaust space during operation of said cell.

2. Cell according to claim 1 wherein said gas permeable walls comprise electrolyte-repellent material.

3. Cell according to claim 1 wherein compressible gas-permeable cushioning layers are provided to yield with respect to the negative electrode when volume of the latter increases during discharge of the cell.

4. Cell according to claim 1 wherein at least one of said gas permeable walls has a stiffness such that permits its yielding when volume of the negative material increases during discharge of the cell.

5. Cell according to claim 1 wherein said valve-like means comprises a porous layer impregnated with water-repellent material.

6. Cell according to claim 1 wherein said exhaust space is defined between a said cover means and a said metallic member.

7. Cell according to claim 1 wherein said positive electrode has a hollow space in communication with perforations of said metallic members via which oxygen may be introduced to effect operation of the cell and whereby deleterious gases generated in the cell during discharge may be vented.

8. Cell according to claim 1 including means on said cover means to lengthen the escape path of liquid outwardly from the cell.

9. Cell according to claim 8 wherein said means on said cover means comprises annular members having projections embedded deeply in a positive electrode of said cell.

10. A leak-proof storagable oxygen depolarized cell comprising a tubular metal container, whose inner surface has a coating of passivated zinc, a tubular porous electrolyte-repellent positive electrode extending longitudinally in said container, air permeable lining means on the inner face of said positive electrode, a fine meshed grid surrounding the outermost surface of said positive electrode, a stable metallic grid positioned outwardly of said fine meshed grid, an electrolyte saturated separator surrounding said stable metallic grid, a negative electrode surrounding said separator, said negative electrode being dimensioned to engage the said coating, a plurality of elongated longitudinally extending free spaces adjacent said negative electrode, gas-permeable walls defining said free spaces and extending the full length of said negative electrode, a member at one end of said container of gas-impermeable, water-repellent material having a projection embedded in said positive electrode material to provide an enlarged creep path for liquid within the cell, a second member at the other end of said container of like material as said first-named member also having a projection embedded in said positive electrode material to provide an elongated creep path for liquid at said other end, a metal cover having its periphery embedded in said first-named member and with said member defining a gas exhaust space outwardly of said positive electrode, said cover having perforations communicating with the longitudinal inner space of said tubular positive electrode, means electrically connecting said cover to at least one of said grids, a metallic cover at the other end of said container whose periphery is embedded in said second-named member, said second cover being electrically connected to said metallic casing and having perforations also communicating with said longitudinal inner space, means providing communication between said exhaust space and said longitudinally extending free spaces for transit to said exhaust space of gas evolved in said free spaces during operation of said cell, and passage means in said first-named member between said exhaust space and said positive electrode to permit transit through said positive electrode only of gas arriving in said exhaust space while preventing escape of liquid from said cell.

11. Leak-proof storage oxygen depolarized cell comprising a container, a porous electrolyte-repellent positive electrode within said container, a negative electrode of comminuted material in proximity to said positive electrode, a separator between said electrodes, an immobilized electrolyte between said electrodes, at least one elongated free space adjacent said negative electrode to serve as gas collector for gases evolved during cell operation, electrolyte repellent walls defining each such free space, said cell having an exhaust space located outwardly of said positive electrode and communicating with each such free space, gas-impermeable, liquid-repellent cover means for said positive and negative electrodes, and oneway valve-like means adjacent said exhaust space providing communication between said free spaces and said exhaust space to permit venting into said exhaust space of gas collected in any said free space into said exhaust space and passage means for venting gases from said exhaust space via said positive electrode while precluding escape outwardly of liquid from the cell.

12. Leak-proof storage oxygen-depolarized cell comprising a container, a porous electrolyte-repellent positive electrode, a negative electrode of comminuted material, a separator, and an immobilized electrolyte, said negative electrode having at least one elongated free space adjacent said negative electrode to serve as a gas collector, gas-permeable walls defining each said free space, said cell having an exhaust space communicating with each said free space, and one-way valve-like means providing said communication between each said free space and said exhaust space to permit venting of gases developed in operation of said cell into said exhaust space, and passage means for venting gases from said exhaust space via said positive electrode while precluding escape outwardly of liquid from the cell.

* * * * *